April 20, 1937.                 C. E. QUICK                   2,077,896
                             DOUGH FEEDING MEANS
                          Filed Feb. 12, 1936        2 Sheets-Sheet 1
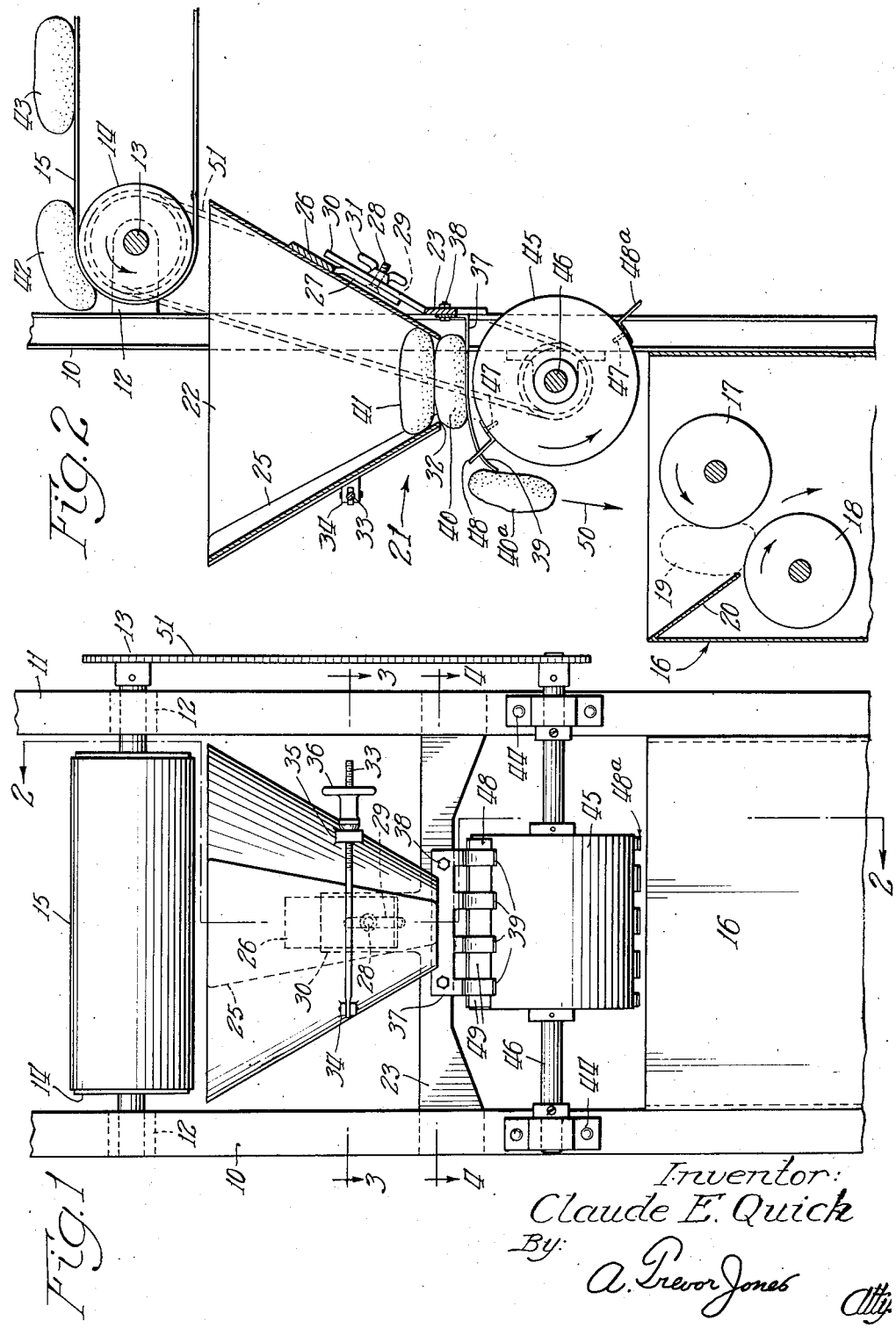
Inventor:
Claude E. Quick
By: A. Trevor Jones   Atty.

April 20, 1937.  C. E. QUICK  2,077,896
DOUGH FEEDING MEANS
Filed Feb. 12, 1936  2 Sheets-Sheet 2
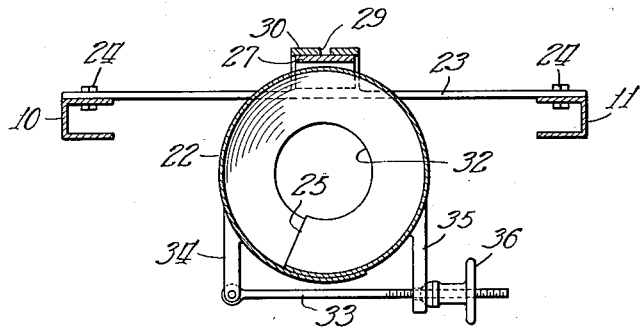
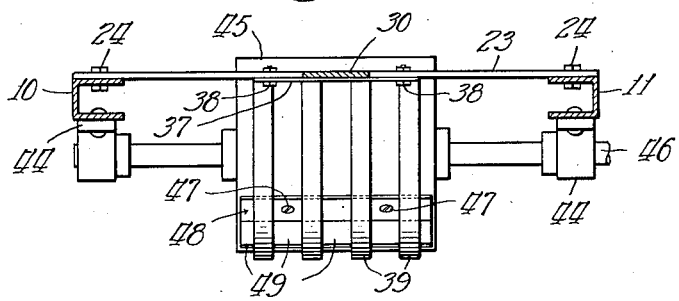
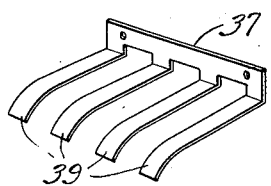
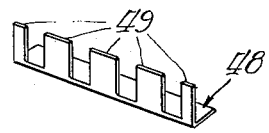
Inventor:
Claude E. Quick
By: A. Trevor Jones  Atty.

Patented Apr. 20, 1937

2,077,896

UNITED STATES PATENT OFFICE 2,077,896

DOUGH FEEDING MEANS

Claude E. Quick, Glendale, Calif., assignor to Western Bakeries Corporation, Ltd., Los Angeles, Calif., a corporation of California Application February 12, 1936, Serial No. 63,521

4 Claims. (Cl. 107—7)

This invention relates to feeding means for dough or the like, more particularly for use in bread bakeries in connection with large-scale production of individual loaves of bread.

Among other objects the invention aims to provide means for ensuring the delivery of one lump of dough at a time for the production of a single individual loaf, to the molder and thus preventing what are known in the bakery trade as doubles. A further object is to provide novel, efficient and adjustable means for this purpose.

Other objects and advantages will be apparent from the following description taken together with the accompanying drawings showing an illustrative embodiment of the invention in which—

Figure 1 is a front elevational view of a structure embodying my improvement;

Figure 2 is a side elevational view of the same, partially in section and being a section taken on the line 2—2 of Fig. 1;

Figure 3 is a cross-section taken on the line 3—3 of Fig. 1;

Figure 4 is another cross-section taken substantially on the line 4—4 of Fig. 1;

Figure 5 is a detail perspective view of the comb support; and

Figure 6 is a similar view of the ejecting fork.

Referring in detail to the figures of the drawings, the spaced-apart upright beams 10, 11 provide standards on which is journaled as by brackets 12 the shaft 13 of a conveyor roller 14 about which is entrained the usual belt conveyor 15. The conveyor belt may be the discharge belt of any appropriate mechanism such as a divider and proofer or the like for treating the bread dough and delivering spaced-apart individual loaves of the dough, one loaf at each of regular timed intervals to the usual molder, the receiving head of which is indicated generally by the numeral 16. This molder head may include the conventional dough-treating rolls 17, 18 through which a loaf of dough 19 delivered from the belt 15 is intended to pass, the structure 16 conveniently being provided with a deflector plate 20 which assists in directing the loaf 19 into the space between the rolls 17, 18.

It is customary to so arrange the conveyor belt 15 and the molder-head 16 that the individual loaves of dough, being already suitably spaced apart on the conveyor belt 15, fall off the end of the belt by gravity and thus drop at timed intervals into the molder-head 16, but it frequently happens, due to slippage in the proofer, that the dough loaves get out of proper interval relation on the conveyor 15 and two dough loaves, or a "double", may be delivered to the hopper head 16, which causes considerable trouble and inconvenience.

In accordance with my invention, to avoid the formation of these so-called doubles as well as to ensure correctly-timed interval delivery to the molder, I have interposed between the delivery belt 15 and the molder-head 16 the timing mechanism indicated generally by the numeral 21 and next described in detail. For this purpose I have shown the conveyor belt 15 supported on the standards 10, 11 at a sufficient height so that the timing mechanism 21 may be interposed between the belt 15 and the molder-head 16 all in substantially vertical relation so that the action of gravity may still be availed of.

As here shown, the timing mechanism 21 is provided with a receiving hopper 22 which is mounted on a transverse truss 23 suitably bolted to the standards 10, 11 at 24. The hopper 22 is desirably formed in this instance of volute shaped sheet material having its ends adjustably overlapping as at 25 so that the diameter of the frustum of a cone formed by the hopper may be selectively varied. Upon its side opposite the overlapping ends 25 the sheet material of the hopper may have welded thereto a plate 26 having an offset portion 27 through which passes the threaded bolt 28. As best shown in Fig. 2, bolt 28 is received in the elongated slot 29 provided in the integral bracket portion 30 of the truss 23, this bracket portion being angular in the direction of the sides of the hopper 22 so as to be substantially parallel therewith. By means of the wing nut 31 on the bolt 28, the hopper 22 may be secured in vertical adjustment on the support 23.

The natural resilience of the metal of the hopper 22 tends to spread the overlapped ends 25 apart to enlarge the diameter of the hopper and by suitable clamping mechanism this expansion may be limited to regulate the size of the delivery opening 32 at the lower or smaller end of the hopper. Such clamping mechanism may include a threaded rod 33 hinged to lugs 34 on one of the overlapping ends of the hopper and passing freely through another lug 35 on the other overlapping end, a hand screw 36 being in threaded engagement on the rod 33 outwardly of the lug 35 and being turned to abut this lug and thus draw the lugs 34, 35 toward each other.

The truss 23 also, in accordance with my invention, carries a rest surface here shown in the form of a comb support 37 suitably bolted as at 38 to the truss 23 and having tines, in this instance four, 39, which are disposed directly beneath the discharge opening 32 of the hopper.

By means of the manual adjustment members 31 and 36, the relation of the discharge end of the hopper 22 to the rest surface provided by the comb support 37, may be adjusted so that only one loaf at a time will be received on the comb, for example the loaf 40, another loaf say 41 being still held within the hopper which could also receive the loaves 42 and 43 for example, and temporarily retain these loaves 41, 42 and 43 until the loaf 40 is ejected into the molder by mechanism further in accordance with my invention and which I will next describe.

Directly beneath the comb support 37 and also mounted on the standards 10, 11 as by brackets 44 I have shown an ejector drum 45 which is carried by a rotatable shaft 46 journaled in the brackets 44. Secured as by screws 47 to the periphery of the ejector drum 45 I have shown a plurality of similar forks 48 and 48a having upstanding radially directed fingers 49 which, upon revolution of the drum 45, are arranged to be intercalated with the fingers 39 of the comb support 37. The two forks 48 and 48a here shown are arranged diametrically opposite on the drum 45 so that at each half-revolution of the drum the fingers 49 of one of the forks move the loaf of dough on the comb 39 off of this rest surface and carry it in the direction of the arrow 50 so that it drops into the molder, allowing another lump of dough to be received by gravity on the rest surface and similarly ejected upon the next half-revolution of the drum.

For example, the fork 48 has just ejected the loaf 40a and the fork 48a upon the next half-revolution of the drum 45 will eject only the loaf 40 regardless of how many more loaves there may be in the hopper 22. Thus regardless of the intervals at which the lumps of dough are deposited by the conveyor belt 15 onto the hopper 22, the lumps of dough will be delivered to the molder at regularly timed intervals and one at a time.

The ends of the tines 39 are desirably curved downwardly as shown, and the fingers 49 of the forks 48 and 48a intermediate the end fingers are desirably broad, so as not to mark the loaves.

By means of a chain-and-sprocket drive 51 the drum 45 may be driven off the shaft 13 to turn counterclockwise as looked at in Fig. 2 and at the same speed as the conveyor belt.

The invention of course is not limited to the details of construction herein shown for purposes of exemplification.

Having described my invention, I claim:

1. Dough feeding means comprising, in combination, a temporary support for a lump of dough, a bracket associated with the support, a hopper carried by said bracket for initially receiving said lump of dough, and means carried jointly by the hopper and bracket for adjusting the hopper with respect to the support.

2. Dough feeding means comprising, in combination, a temporary support for a lump of dough, a hopper mounted above said support for initially receiving said lump of dough, said hopper being in the form of an inverted frustum of a cone open at both ends and having its smaller end spaced above the support whereby the lump of dough may pass by gravity from the hopper to the support, means for adjusting the spacing of said smaller end of the hopper from the support, and means for adjusting the size of the opening in said smaller end.

3. The structure of claim 1 wherein the bracket has a portion which is angular to the axis of the hopper and parallel with the side thereof to which the hopper is adjustably secured.

4. The structure of claim 2 wherein the hopper is formed of resilient overlapping material having free ends, the hopper being attached to the bracket intermediate said free ends, and the free ends carry clamping means for drawing them together against their natural resistance to reduce the size of the said opening in said smaller end of the hopper.

CLAUDE E. QUICK.